United States Patent [19]

Schwarz et al.

[11] Patent Number: 4,947,391
[45] Date of Patent: Aug. 7, 1990

[54] ARRANGEMENTS FOR PRODUCING AND RECOGNIZING INFORMATION IDENTIFYING NON-OCCUPIED TRANSMISSION PATHS IN A DIGITAL TRANSMISSION SYSTEM

[75] Inventors: Dieter Schwarz; Hans-Dieter Kauschke, both of Nuremberg, Fed. Rep. of Germany

[73] Assignee: U.S. Philips Corporation, New York, N.Y.

[21] Appl. No.: 406,983

[22] Filed: Sep. 13, 1989

Related U.S. Application Data

[60] Division of Ser. No. 275,643, Nov. 22, 1988, which is a continuation of Ser. No. 887,581, Jul. 18, 1986, abandoned.

[30] Foreign Application Priority Data

Jul. 20, 1985 [DE] Fed. Rep. of Germany ....... 3526020

[51] Int. Cl.$^5$ .................................................. H04J 3/12
[52] U.S. Cl. ............................... 370/110.1; 340/146.2
[58] Field of Search ............. 370/110.1, 16, 13, 105.4; 340/146.2, 825.01, 827; 371/8; 328/108, 119

[56] References Cited

U.S. PATENT DOCUMENTS

| | | | |
|---|---|---|---|
| 3,609,703 | 9/1971 | Peacock | 340/146.2 |
| 4,513,441 | 4/1985 | Fraser | 370/13 |
| 4,550,403 | 10/1985 | Beynie | 370/13 |
| 4,829,462 | 5/1989 | Freeman et al. | 340/146.2 |
| 4,847,877 | 7/1989 | Besseyre | 340/146.2 |

*Primary Examiner*—Douglas W. Olms
*Attorney, Agent, or Firm*—Anne E. Barschall

[57] ABSTRACT

Arrangement for producing and recognizing information identifying non-occupied transmission paths in a digital transmission system.

It is known in the art to characterize, by means of special bits in the time-division multiplex signal frame, transmission paths in a PCM transmission system which do not convey a useful signal, or to refrain from transmitting a signal through a non-occupied transmission path. To prevent the necessity of resolving the frame structure down to the bit plane for enabling recognition of the identification of non-occupied and undisturbed transmission paths, a digital signal pattern is used which is periodical, is distributed over the time-division multiplex frames and cannot be simulated by frame alignment of system alarm words nor by the useful information. If more specifically the inverted version of the standardized alarm-indication-signal AIS is used as the digital signal pattern, then the additional circuit cost and design effort in realizing arrangement for producing and recognizing this pattern is very low because of the fact that AIS-generators and AIS-recognition circuits already present in existing equipment can be utilized very efficiently in such a realization.

1 Claim, 1 Drawing Sheet

ARRANGEMENTS FOR PRODUCING AND RECOGNIZING INFORMATION IDENTIFYING NON-OCCUPIED TRANSMISSION PATHS IN A DIGITAL TRANSMISSION SYSTEM

This is a division of application Ser. No. 07/275,643, filed Nov. 22, 1988 which is a continuation of Ser. No. 06/887,581, filed July 18, 1986, and now abandoned.

The invention relates to an arrangement for producing information identifying non-occupied transmission paths in a digital transmission system as defined in the preamble of claim 1.

The German "Auslegeschrift" DE-AS 27 53 420 discloses an arrangement for switching from operational to stand-by transmission paths in transmission systems for digital signals. In this known arrangement, predetermined bit positions in the time-division multiplex frame are used for identifying non-occupied transmission paths. However, these predetermined bit positions in the time-division multiplex frame signal are not available in every time-division multiplex transmission system. In the frame structure of a standardized 2 Mbit/s time-division multiplex systems, the frame alarm word and the system drawn word are alternatively transmitted in the first time slot of the frame. In the system alarm word, the bit positions 5 to 8 are freely available for the system user for transmitting additional information. Up to 16 different messages can be transmitted by means of these four bits that are commonly referred to as Y-message bits. In a standardized 8 Mbit/s and also in a standardized 34 Mbit/s time-division multiplex transmission system such Y-message bits are not available. In a standardized 140 Mbit/s time-division multiplex transmission system, the frame structure comprises two Y-message bits in the bit positions 15 and 16 in set I (cf. for example TEKADE Technische Mitteilungen 1984, pages 17 to 22, more specifically page 17).

If the Y-message bits of the time-multiplex frame are used for the purpose of identifying non-occupied transmission paths, then this type of identification cannot be utilized for all types of time-division multiplex transmission systems, as such Y-message bits are not available in every frame structure (compare those of the 8 Mbit/s and 34 Mbit/s time-division multiplex transmission systems) or only a small number of different messages can be transmitted (in the 140 Mbit/s time-division multiplex transmission system having two Y-message bits, only four different messages can be transmitted).

In the arrangement disclosed in German "Auslegeschrift" DE-AS 27 53 420, the substitute switching from n operational systems to one stand-by system is effected by means of control arrangements included in the line terminal equipment of the stand-by system. The control arrangements always insert in the position of the Y-message bits an operational status character or, in the case of mal-functioning, the addresses of the operational system to be switched-over; the operational status character in the two transmission directions of the stand-by system can also be a standardized alarm-indication signal, commonly referred to as AIS.

The AIS is used in the digital transmission technique to report a transmission disturbance, for example a frame alignment disturbance (cf. the European Patent EP-B1-0 031 943), and is a permanent-1 signal. According to European Patent, EP-B1-0031943, this signal is produced by an AIS-generator arranged in the line terminal equipment and is used to suppress a subsequent alarm in the subsequent signal path. This prevents alarm signals from occurring in the entire down-stream section of the transmission path in the event of a disturbance in the upstream sections of the transmission path. From European Patent EP-B1-0 031 943 it is known that it is also possible to include such AIS-generators in the intermediate regenerators (repeaters). In addition to the AIS generators, the line terminal equipment also includes supervision arrangements connected to a central monitoring station via a control line. The AIS-generator in question can be connected to the output of the line terminal equipment at the receiving side by means of a change-over switch that is remotely controlled by the central station. Furthermore, it is known from the above-mentioned publication (TEKADE Technische Mitteilungen 1984, pages 17 to 22) to provide in a plesiochronous digital signal multiplexer a supervision circuit at the interface. E 140 Mbit/s (SSTEE) for recognizing the AID-signal in the sequence digital signal. On page 20 of said publication, it is set forth that for stand-by switching purposes a switch-over from the operational input B at the input of the SSTEE-interface to a second (stand-by) input E can be effected, which change-over action of the switch can be effected manually or automatically and be remotely controlled. Before the change-over action, no signal is transmitted through the stand-by channel in the 140-Mbit/s plane.

The invention has for its object to provide an arrangement for producing an information identifying non-occupied transmission paths in a digital transmission system which can be used for identifying a ready-for-operation status of digital signal links having any frame structure whatsoever and any bit rate whatsoever.

This object is accomplished by means of an arrangement as claimed in the characterizing part of claim 1.

The arrangement according to the invention has the advantage that the arrangements already present in existing time-division multiplex transmission systems for producing the alarm-indication-signal AIS can also be used for producing the digital signal pattern and consequently the additional circuit efforts are small. The digital signal pattern can be used irrespective of the frame structure opted for and does not cause any restriction in the data-transparency. Compared to the identification of the non-occupied transmission path by means of Y-message bits as described in German "Auslegeschrift" DE-AS 27 53 420, the distribution of the digital signal pattern over the time-division multiplex frames also simplifies the recognition of the information identifying a non-occupied transmission path.

If the digital signal pattern is produced by inverting the standardized AIS then it is, for example, only necessary to add an inverter to the AIS-generator described in European Patent EP-B1-0 031 943.

Also in the arrangement for recognizing the information identifying non-occupied transmission paths resolving the digital signal pattern down to the bit plane is not necessary, contrary to the arrangement described in the German "Auslegeschrift" DE-AS 27 53 420. With the arrangement according to the invention it is not only possible to recognize the digital signal pattern, but moreover also the standardized AIS can be recognized. The circuit effort for the arrangement is low and commercially available digital logic circuits can be used for the circuitry.

The invention and how it can be put into effect will now be described in greater detail by way of example with reference to an embodiment shown in the accompanying drawing, in which.

Figure 1:
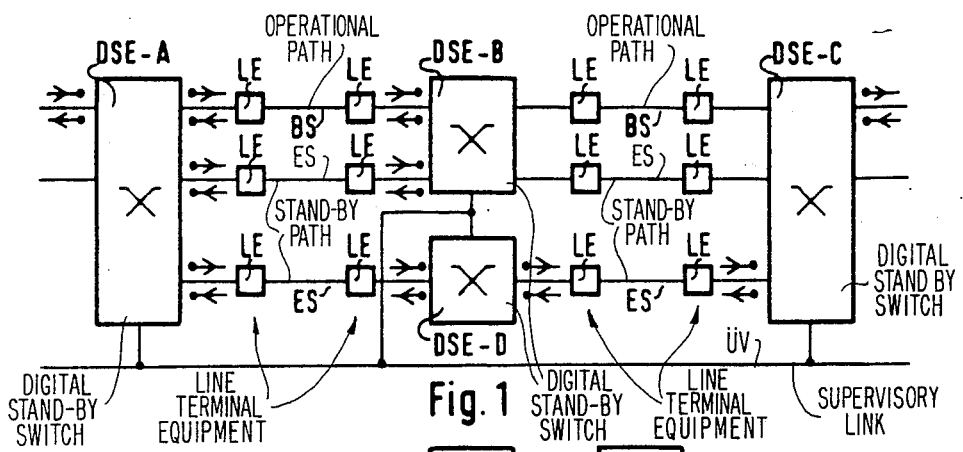
FIG. 1 shows the network structure of the digital transmission system.

FIG. 1 shows a possible section of the network of a time-division multiplex transmission system. Combining the digital signals for obtaining a PCM transmission system (from basic PCM 30 systems (primary blocks composed of 30 PCM channels) by means of digital signal multiplexers is not illustrated in FIG. 1. The information stream occurring at the output of a plesiochronous digital signal multiplexer is respectively applied to the digital-signal standby-switch circuits DSE-A, DSE-B, DSE-D and DSE-C shown in FIG. 1. The information identifying non-occupied transmission paths is produced by arrangements provided in the digital-signal stand-by-switch circuits DSE-A to DSE-D or in the line terminal equipment LE. In addition to the arrangement for producing a digital signal pattern MDS, these arrangements include an arrangement for recognizing the digital signal pattern MDS (cf. FIG. 2).

When the non-occupied transmission paths are stand-by paths which are reserved for the case of derangement, a switch-over from the disturbed operational path to a stand-by-path in the digital-signal stand-by-switch circuits DSE-A to DSE-D can be effected. Using a digital signal pattern MDS which is a periodic signal and is distributed over the time-division multiplex frame in a time-division multiplex transmission system, has the advantage that for recognizing the information it is not necessary to resolve the frame down to the bit plane and consequently non-occupied transmission paths of any digital transmission paths of any digital transmission systems can be characterized in a simple way and manner. If the inverted version of the standardized alarm-indication-signal AIS is used as the digital signal pattern MDS, then only minor changes are required both in existing and commercially available AIS-generators and in AIS-recognition circuit. Hereinafter the method of switching to the stand-by circuits will be described in greater detail, on the basis of the possible different modes of operation. Switching to a stand-by path ES between the locations A, B, C and D can be effected manually, semi-automatically or fully automatically. When switching is effected manually, the operators decide (a telephone connection existing between the different locations) the instant at which the change-over will be made and to which one of the stand-by paths ES. For semi-automatic switching, the change-over is effected through a supervisory link UV by means of a control arrangement in a higher-ranking exchange and it is triggered by pushing a button. For fully automatic switching, the central control refers to the instantaneous network mapping, chooses a free stand-by path and switches to this free stand-by path ES.

When the operational path BS is in good order, a respective valid digital signal GDS is received and transmitted in the corresponding arrangements (line terminal equipment LE or digital-signal stand-by-switch circuits DSE-A to DSE-D). For instance when the path BS between the locations A and B is in proper-working order, a valid digital signal GDS is transmitted from location A and received in location B. From there a valid digital signal GDS is also transmitted through the path BS in the return direction to location A and received there. Through the stand-by path ES, shown in FIG. 1, between the locations A and B the digital signal pattern $^M$DS is transmitted from location A (or location B) and received at location B (or location A). This als holds for the stand-by paths ES between the locations A and B, D and C as well as B and C. Receiving the digital signal pattern MDS at the ends of a stand-by path ES (between the locations A and B, B and C, A and D, D and C) signalizes that the corresponding stand-by path ES is in proper working order.

When the path BS from location A to location B is disturbed, and not disturbed from location B to location A, a valid digital signal GDS is transmitted from location A. whilst in location B no digital signal KDS or AIS is received. KDS then implies an interruption between line terminal equipment LE in question and digital-signal stand-by-switch circuit DSE-B and AIS implies an interruption between the line terminal equipments LE. Since, as assumed above, the path BS between the location B and the location A is in good order, a valid digital signal GDS is transmitted from the location B and received in location A. Assuming that the stand-by path ES between the location A and the location B is in proper working order and is free (ie. the digital signal pattern MDS is received both in location A and in location B), a change-over to this stand-by path ES can be effected. After switching, the digital signal pattern MDS is transmitted from location A through the path BS, and furthermore KDS or AIS is received in the location B. The digital signal pattern MDS is transmitted from location B and is received in location A. After switching to this stand-by path ES between location A and location B, the respective valid digital signal GDS transmitted through this stand-by path ES is received again in location A and in location B.

When the path BS between location A and location B has been restored, the digital signal pattern MDS transmitted from location A through the path BS is received again in location B, so that a switch from the stand-by path ES to the path BS between the locations A and B can be effected. After the switching action, the valid digital signal GDS is again transmitted through the path BS and the digital signal pattern MDS is again transmitted through the stand-by path ES.

For the following observation it is assumed that the operational path BS and the stand-by ES between the location A and the location B are disturbed. The valid digital signal GDS transmitted through the path BS from location A and the digital signal pattern MDS transmitted through the stand-by path ES are not received in location B, but in location B the signals KDS or AIS are recognized. A switch to the stand-by path ES between location A and location D and also to the stand-by path ES between location D and C can be effected when both stand-by paths ES are in proper working order, that is to say when the digital signal pattern MDS is received in both location A and location D as well as in location C. After the switch to the respective stand-by paths ES between location A and location D and between location D and location C, the digital signal pattern MDS is again exchanged between the locations A and B, B and C through the operational paths BS now switched to the stand-by mode. After the disturbance in the operational path BS between the location A and location B has been eliminated and the subsequent switch-back to the normal mode, the digital signal pattern MDS is again transmitted through the standby paths ES between location A and location B and also between location D and location C and the valid digital signal GDS is transmitted and received through the respective paths BS between the locations A and B and between the locations B and C.

Figure 2:
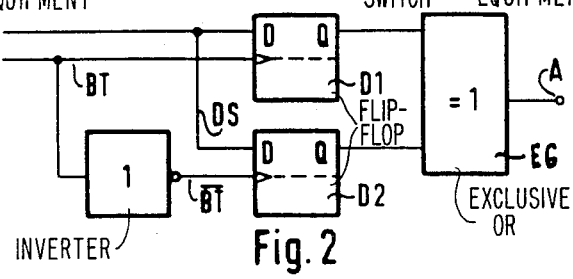
FIG. 2 shows the arrangement according to the invention for recognizing the information identifying non-occupied transmission paths of a time-division multiplex transmission system employing CMI-encoding.
Figure 3:
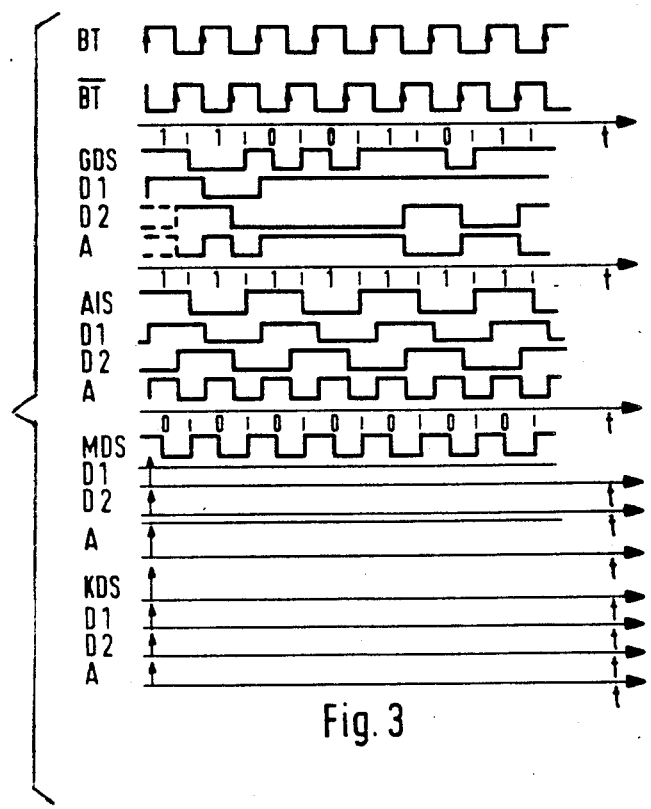
FIG. 3 shows the variation versus time of the signals produced in the arrangement of FIG. 2.

FIG. 2 shows an embodiment of an arrangement for recognizing the information identifying non-occupied transmission paths. The arrangement comprises two D flip-flops whose Q-outputs are connected to the two inputs of an EXCLUSIVE-OR gate EG. The digital signal ES received in the relevant equipment, for example the line terminal equipment LE, is applied to the respective preparatory input D of the two D flip-flops D1 and D2. The operating clock BT is applied to the clock input of the first D flip-flop D1 and the inverted operating clock $\overline{BT}$ is applied to the clock input of the second D flip-flop. The signals produced at the output A of the EXCLUSIVE-OR-gate EG obtained in response to the digital signal applied to the preparatory input D will now be described in greater detail with reference to FIG. 3.

If a valid digital signal GDS is applied to the preparatory input D of the two D flip-flops D1 and D2, then a non-periodical digital signal is produced at the output A of the EXCLUSIVE OR gate EG. If on conteast therewith the alarm-indication-signal AIS is applied to the preparatory input D, then the operational clock BT is produced at the output A. If the digital signal pattern MDS is applied to the preparatory input D, then the signal at the output A assumes the binary "1" state. If, finally, no valid digital signal KDS is applied to the preparatory input D, then the binary "0" state occurs at the output A. In each of these cases noise impulses may be present in practice.

The method according to the invention for identifying non-occupied transmission paths now provides the possibility to distinguish between the situation in which the individual transmission path is not occupied and in proper working order and the situation in which a line interruption occurs.

What is claimed is:
1. Apparatus for recognizing a periodic signal pattern, the apparatus being for use in a digital transmission system which includes: a currently operating system for transmitting useful time-division multiplexed information in a plurality of time-division multiplex frames having a prescribed format; and a stand-by system for replacing the currently operating system in case of disturbance, the periodic signal pattern being distributed over respective ones of the time-division multiplex frames and identifying non-occupied transmission paths in such a way that neither frame alignment, nor system alarm words, nor the useful information mimics the periodic signal pattern, the apparatus comprising:
   a. first and second D flip-flops including respective:
      i. preparatory D-inputs coupled to receive a digital input signal;
      ii. clock inputs, the clock input of the first D flip-flop being coupled to receive an operating clock signal, the clock input of the second D flip-flop being coupled to receive an inverted version of the operating clock signal;
      iii. Q inputs;
   b. an exclusive OR gate having first and second inputs coupled to the Q outputs of the first and second D flip-flops, respectively;
   whereby, under the control of the operating clock, said exclusive OR gate outputs one of first and second logic levels, according to whether the received signal is the periodic signal pattern or the system alarm words or some other signal.

* * * * *